Sept. 20, 1971    H. JONESI    3,605,287
AMUSEMENT AND TEACHING DEVICE
Filed July 14, 1969
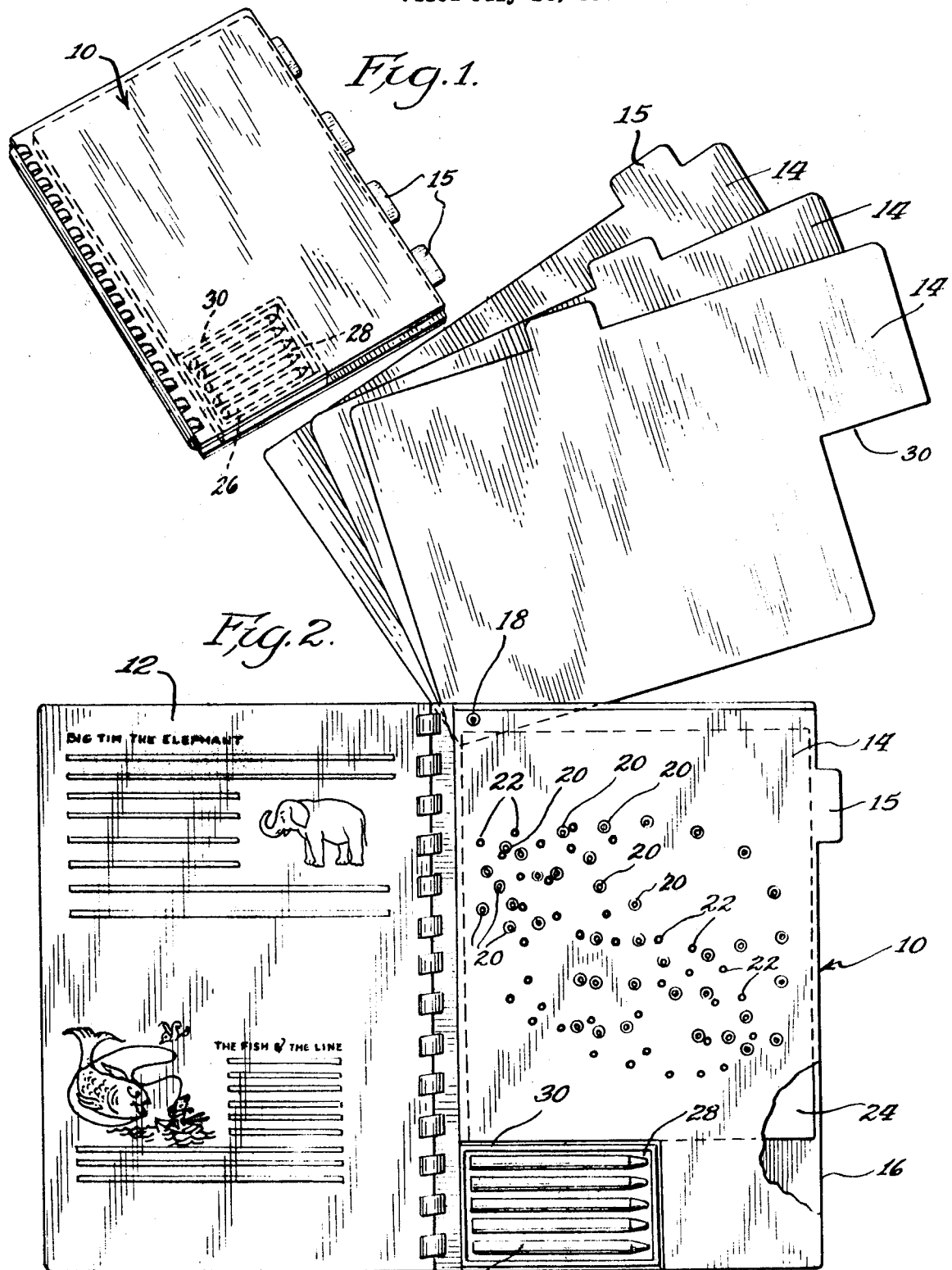
Inventor
Howard Jonesi
By Max R. Kraus. Atty

United States Patent Office 3,605,287
Patented Sept. 20, 1971

3,605,287
AMUSEMENT AND TEACHING DEVICE
Howard Jonesi, 1526 W. Fargo Ave.,
Chicago, Ill. 60626
Filed July 14, 1969, Ser. No. 841,313
Int. Cl. G09b 11/04
U.S. Cl. 35—26    4 Claims

ABSTRACT OF THE DISCLOSURE

An amusement and teaching device for use in forming the outline of a character or figure comprising, a guide member provided with a first plurality of small openings arranged to form the outline of a first figure or character, a second plurality of small openings arranged to form the outline of a second character or figure, with the first and second plurality of openings each having different identifying means, and a marking surface adapted to be positioned under the guide member so that a series of dots forming the outline of the figure or character can be impressed on the marking surface through the plurality of openings on the guide member.

BRIEF SUMMARY OF THE INVENTION

This invention relates to an amusement and teaching device for forming the outline of a plurality of characters or figures.

An object of this invention is to provide an amusement and teaching device comprising a guide member having a plurality of small openings correlated and arranged to form the outlines of a plurality of characters or figures so that by following the proper set of openings the outline of various figures may be formed. The invention herein may be utilized in combination with a booklet having illustration or instruction pages so that the child can readily identify the character forming the outline.

With the foregoing and other objects which will appear as the description proceeds, the invention consists of certain novel features of construction, arrangement, and a combination of parts hereinafter fully described, illustrated in the accompanying drawings, and particularly pointed out in the appended claims, it being understood that various changes in the form, proportion, combination, size and minor details of the structure may be made without departing from the spirit or sacrificing any of the advantages of the invention.

BRIEF DESCRIPTION OF THE DRAWINGS

In the drawings:

FIG. 1 is a perspective view of the booklet in a closed position which embodies the features of the invention.

FIG. 2 is a plan view of the booklet in open position, with one of the guide members in exposed position for marking, and also showing the marking sheet positioned under the guide member and showing the illustration or instruction sheet.

DESCRIPTION OF THE EMBODIMENTS

While the invention herein illustrated may comprise a single guide member which embodies the elements of the invention, the invention is shown in the form of a plurality of guide members assembled in a booklet.

The booklet is indicated generally by the numeral 10 and comprises a cover and a back side between which are bound a plurality of illustration or instruction sheets, one of which is indicated by the numeral 12, best shown in FIG. 2, and a plurality of guide members all indicated by the numeral 14. The guide members are each formed of a cardboard or other suitable material and they are secured to the back cover 16 of the booklet by means of an eyelet 18 adjacent the upper left corner so that the guide members, other than the one which is being used, can be pivoted to an out-of-the-way position, such as shown at the upper portion of FIG. 2. Each of the guide members has an arrangement of spaced small openings in patterns or arrangements to form the outlines of two or more figures or characters. Each series of openings is identified by a different color or designation. For example, the openings designated by the numeral 20 and indicated by two concentric circles could be openings which are colored red and would form the outline of a first figure, for example, an elephant. The other openings shown by a single circle and indicated at 22 could be colored green and would form the outline of a second figure, for example, a fish. Thus, two series of openings are formed on the single guide member.

A sheet of paper 24 which forms the marking sheet is positioned on the back cover 16 underneath the guide member 14 so that the dot markings may be made on the marking sheet by a pencil or the like through the small openings 20 or 22, to form the outline of the two characters shown on the instruction or illustration sheet. The child can follow the like colored openings 20 with a marking instrument and through said openings make a series of dots on the marking sheet 24 which would outline and form the figure of an elephant on the marketing sheet. Then by placing another sheet 24 under the guide member and similarly marking through the green colored openings 22 the child would form the outline of a fish figure, as shown at the bottom of the illustration page 12. After the outlines have been formed on the respective marking sheet 24, the dots would be connected by lines, as is well understood, thus forming the configurations. The figures may be colored by the coloring crayons 26 contained in a small crayon box 28 secured to the back cover 16 of the booklet. Thus, each guide member 14 by the proper arrangement of the openings 20 and 22 forms the outline of from two to any number of different figures. While only two series of small openings are shown, this can be multiplied by additional opening similar to those indicated but forming a different outline for each figure and the other series of openings would be identified by other colors. It is therefore possible by having a series of arranged openings to provide three, four or five different outlines of various figures on each guide member.

The other guide members or sheets 14 have different arrangements of openings in the same manner as described and, therefore, a booklet formed with five guide members or sheets can have as many as 15 or 20 different figures which may be formed therefrom.

The series of small openings like 20 and 22 are arranged in the distinctive patterns described over a large area of the guide member so that each figure outlined is of a size large enough to conform to the overall size of the marking sheet. Thus for example, the dotted outline of the elephant figure formed on the marking sheet would take up approximately the entire marking sheet and would not be of the size represented by the small illustration on the instruction page 12. The interspersing of the small openings forming the different outlines of figures makes the foregoing possible.

Each guide member is formed with an identifying tab 15 positioned on the right hand side and the tabs are arranged in spaced relation so that any one of the guide members may be readily grasped and pivoted to an out-of-the-way position, such as shown by the three guide member illustration in FIG. 2, to expose the particular guide member desired to be used. Each guide member has a rectangular-shaped cutout 30 at the lower left so that when the guide members are positioned in alinement with the back cover an open space is provided to accommodate the box of crayons.

If desired, instead of having a marking sheet such as shown, which may be a sheet of paper or the like, the back cover can on the inside face thereof be covered with a material so as to form a wipe-off sheet which can be of either a laminated plastic or varnish face and it can be used for an unlimited number of times. The dots would be impressed on the laminated sheet in the same manner as they would be on the marking paper and after being colored could then be wiped off.

With this invention the child can be taught to coordinate the arrangement of similarly colored small openings so that he can follow the series of related or like colored openings from amongst a large number of other colored openings to form a particular outline. This teaches the child to understand and appreciate colors and coordination. In a booklet of relatively few guide members a large number of different configurations, designs, animals and/or characters may be formed.

What is claimed is:

1. An amusement and teaching device comprising, a guide member having a first plurality of small openings arranged to form the outline of a first complete figure, a second plurality of small openings arranged to form the outline of a second complete figure, said first and second plurality of openings both being interspersed over the same general area of a major portion of said guide member, said first and second plurality of openings each having different identifying means, a marking surface adapted to be positioned under the guide member so that an impression can be made on the marking surface through the respective plurality of openings in the guide member by a marking member to form in a series of small marking the outline of a first complete figure or a second complete figure each unrelated to the other and different from the other.

2. A device as set forth in claim 1 in which a plurality of guide members are arranged to form a book, and in which the guide members are pivoted at one end thereof to permit same to be pivoted in out-of-the-way position to expose one of the guide members for use.

3. A device as set forth in claim 1 in which the first plurality of openings forms the outline of an animal figure and the second plurality of openings forms the outline of another figure.

4. A device as set forth in claim 1 in which the first plurality of openings are all identified by the same color and the second plurality of openings are all identified by another color.

References Cited

UNITED STATES PATENTS

| | | | |
|---|---|---|---|
| 841,360 | 1/1907 | Tuck | 35—26 |
| 1,054,465 | 2/1913 | Sontheimer | 283—42 |
| 1,061,913 | 5/1913 | Hughes | 35—26X |
| 1,205,779 | 11/1916 | Peck | 35—26UX |
| 1,206,795 | 12/1916 | Barrington | 35—26 |
| 1,425,597 | 8/1922 | La Borie | 35—26 |
| 1,974,442 | 9/1934 | Baldwin | 35—26UX |
| 2,044,760 | 6/1936 | Anderson | 35—26 |
| 2,245,339 | 6/1941 | Harris | 35—26X |
| 2,427,612 | 9/1947 | Lobb | 35—26UX |

HARLAND S. SKOGQUIST, Primary Examiner

U.S. Cl. X.R.

281—15